United States Patent
Stein et al.

(10) Patent No.: US 7,830,217 B1
(45) Date of Patent: Nov. 9, 2010

(54) METHOD AND SYSTEM OF VECTOR SIGNAL GENERATOR WITH DIRECT RF SIGNAL SYNTHESIS AND PARALLEL SIGNAL PROCESSING

(75) Inventors: Anatoli Stein, Atherton, CA (US); Semen Volfbeyn, Milpitas, CA (US); Nahum Guzik, Palo Alto, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 158 days.

(21) Appl. No.: 12/276,718

(22) Filed: Nov. 24, 2008

(51) Int. Cl.
*H03C 3/00* (2006.01)
*H04L 27/20* (2006.01)

(52) U.S. Cl. ........................ 332/103; 332/144
(58) Field of Classification Search ......... 332/103–105, 332/144, 149
See application file for complete search history.

(56) References Cited

U.S. PATENT DOCUMENTS 6,564,349 B1 * 5/2003 Mitten et al. ................. 714/733

* cited by examiner

*Primary Examiner*—David Mis
(74) *Attorney, Agent, or Firm*—McDermott Will & Emery LLP (57) ABSTRACT

A vector signal generator with direct RF signal synthesis is disclosed. The vector signal generator comprises an RF signal synthesizer, a switch, and a memory. The RF signal synthesizer is configured for converting baseband IQ signals into a modulated digital RF signal. The RF signal synthesizer is connected to an I input, a Q input, a clock input, a control input, and an output, where the clock input is a clock input of the vector signal generator, the control input is a control input of the vector signal generator, and the output is an RF signal output of the vector signal generator. The switch is configured for selecting a source of IQ signals and is connected to an external I input, an external Q input, a stored signal I input, a stored signal Q input, the control input, an I output, and a Q output. The external I input and external Q input are external IQ inputs to the vector signal generator and the I output and the Q output are connected to the I input and the Q input of the RF signal synthesizer. The memory is configured for storing IQ signals samples, said memory being connected to the control input and having a stored I output, connected to the stored signal I input, and a stored Q output connected to the stored signal Q input.

14 Claims, 6 Drawing Sheets

METHOD AND SYSTEM OF VECTOR SIGNAL GENERATOR WITH DIRECT RF SIGNAL SYNTHESIS AND PARALLEL SIGNAL PROCESSING

FIELD OF THE PRESENT TEACHING

The present teaching generally relates to communications. More particularly, the present teaching relates to vector signal generators.

BACKGROUND

Digitally modulated high-frequency test signals are often required in communication systems for transmission measurement and verification purposes. Wireless communications are rapidly becoming a major sector of the communication industry. Therefore there is a constantly growing demand for vector signal generators capable of synthesizing a diversified set of modulated test signals in a radio frequency (RF) range.

Figure 1:
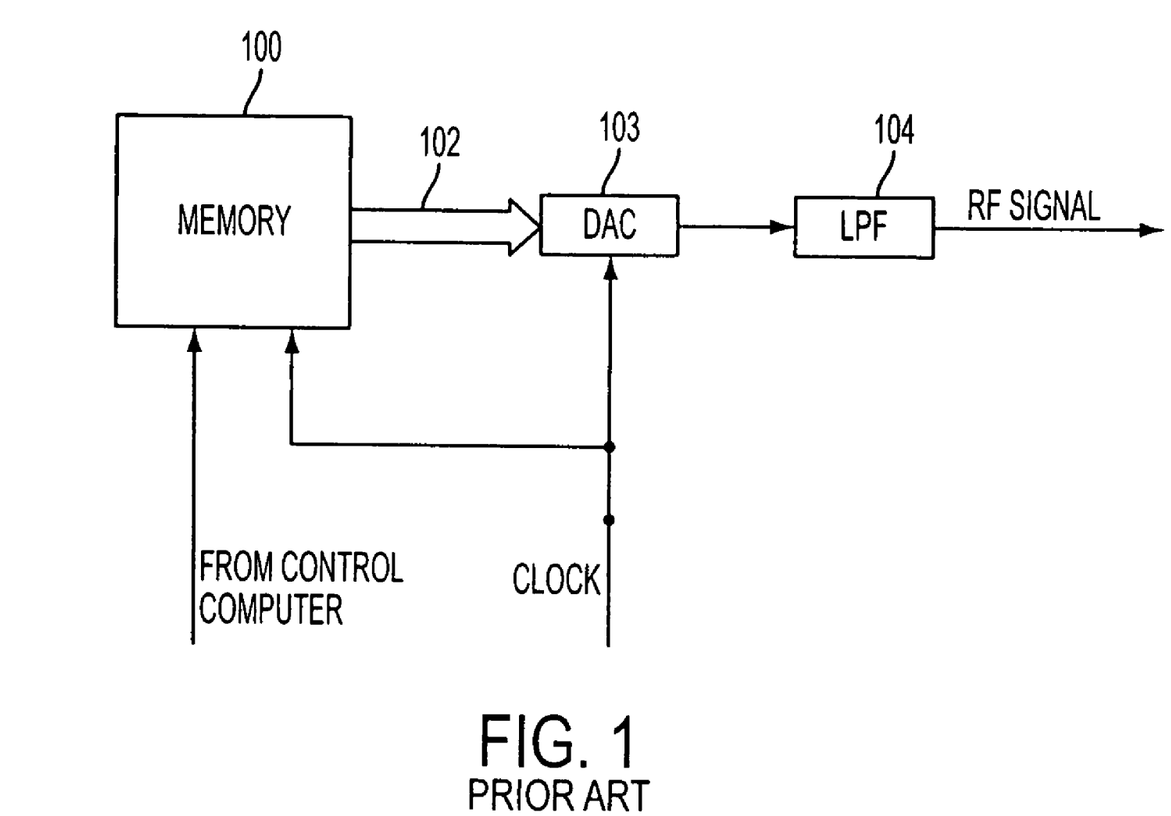
FIG. 1 is a block diagram of a signal generator with direct connection of the waveform memory to the DAC (prior art)

A conventional approach to high-frequency test signal generation (including an IQ modulated signal generation) is to use an arbitrary waveform generator (AWG) having a structure as shown in FIG. 1, where a waveform memory 100 stores a set of precomputed samples (e.g., loaded from a control computer) that represents a desired signal. The samples are provided from the memory 100 to a digital to analog converter (DAC) 103 through a sample bus 102. The DAC 103 produces an analog signal according to the received sequence of digital samples. The analog signal is then passed through a low pass filter 104 that suppresses the spurious frequency components. Such a structure is used, for example, in an arbitrary waveform generator AWG-7000 designed by Tektronix Inc.

There are some disadvantages associated with the AWG shown in FIG. 1. It is not possible to use external data sources. In addition, the length of signal waveforms that can be generated is limited by the size of the waveform memory 100. Once the number of signal waveform segments exceeds the size of the waveform memory, it is not possible to add new segments. Attempts have been made to overcome the limitations related to the waveform memory size by utilizing sequencers to control the playback of the repetitive signal waveforms from the memory. Unfortunately, in many situations, since the sequences of signal waveform segments are similar but not identical, a sequencer is often not effective in terms of compressing the volume of the signal waveforms in the memory. Moreover, this approach does not allow programmable modifications to be made to the signal waveform such as frequency, phase shift or gain changes.

Another feature associated with a conventional AWG as shown in FIG. 1 is that the waveform memory 100 is connected directly to the DAC. This gives rise to another difficulty because it makes it difficult to change the carrier frequency of the modulated signal. It requires reloading of the waveform memory which is time consuming. When it is accompanied by a change in the DAC sampling frequency, then a simultaneous change of the low pass filter located after the DAC is also necessary. The necessity to include into the device a set of interchangeable filters makes it much more cumbersome and expensive.

Figure 2:
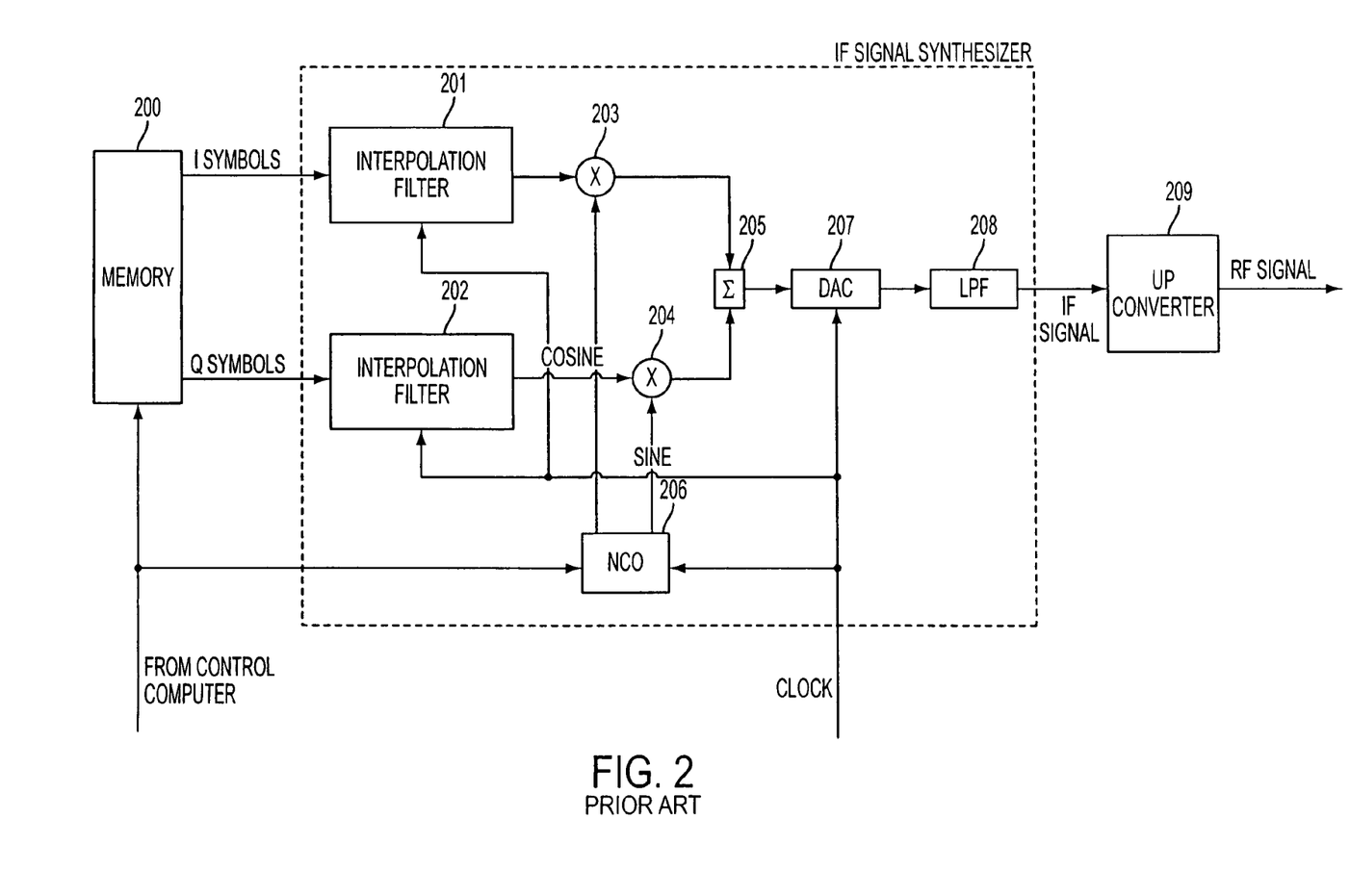
FIG. 2 is a block diagram of a vector signal generator with a digital synthesis of the IF signal (prior art)

Another approach to high-frequency test signal generation is to incorporate an IQ modulator in the signal generator and the output signal of the IQ modulator is converted to a desired RF frequency (see, for example, the U.S. Pat. No. 7,212,585, entitled "Quadrature modulation transmitter"). The advancement in FPGA technology made it possible to design a completely digital IQ modulator. A block diagram having a structure of a vector signal generator with a digital IQ modulator is shown in FIG. 2. A memory 200 is used as a initial signals source to produce I and Q symbol sequences. The memory 200 may store either the symbols themselves to be read out or data to be converted into IQ symbols via coding and mapping. The I and Q outputs from the memory 200 are connected to the interpolation filters 201 and 202 where the sampling rate of the signals can be increased up to a frequency that matches the DAC 207 clock frequency. The interpolated signals from the interpolation filters 201 and 202 are mixed with the sine and cosine carriers from a numerically controlled oscillator NCO 206 in mixers 203 and 204. The outputs of the mixers are then summed in the adder 205 and applied to the digital to analog converter DAC 207. The low pass filter LPF 208 suppresses the spurious high frequency products in the analog signal from DAC output, creating in that way an intermediate frequency (IF) modulated signal. The frequency up converter 209 transfers the IF signal to the RF range for further transmission.

The weak point of the arrangement in FIG. 2 is the up converter 209. The requirements to the up converter are self-contradictory: it is necessary to provide both high accuracy of frequency transfer set up and low phase noise introduced in the transferred signal. In addition, there are problems associated with non-linearity distortions, spurious products appearance and the need for expensive components such as carrier Direct Digital Synthesis (DDS). When the DAC clock frequency is relatively low (in the range of 100 MHz), it may be difficult to suppress un-used side band in the up converter.

Suggestions have been made to utilize direct RF signal digital synthesis that eliminates the IF stage and above mentioned disadvantages (see, for example, the U.S. Pat. No. 5,412,352, entitled "Modulator having direct digital synthesis for broadband RF transmission"). Although the proposed solution addressed the drawbacks of the vector signal generator with the up converter, since the signal processing rate was bounded by FPGA ratings, the output signal frequency range was only in the range of 5-40 MHz.

Thus, there is a need for a vector signal generator that is free from the above mentioned disadvantages, where a direct digital RF signal synthesis with present day rates of digital signal processing in a regular FPGA (about 120-250 MHz) combined with high frequency DAC, which makes it possible to generate modulated signal in high frequency RF range (up to 11 GHz and higher).

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION OF THE PRESENT TEACHING

The goal of the present invention is achieved by application of parallel signal processing in real time.

Figure 3:
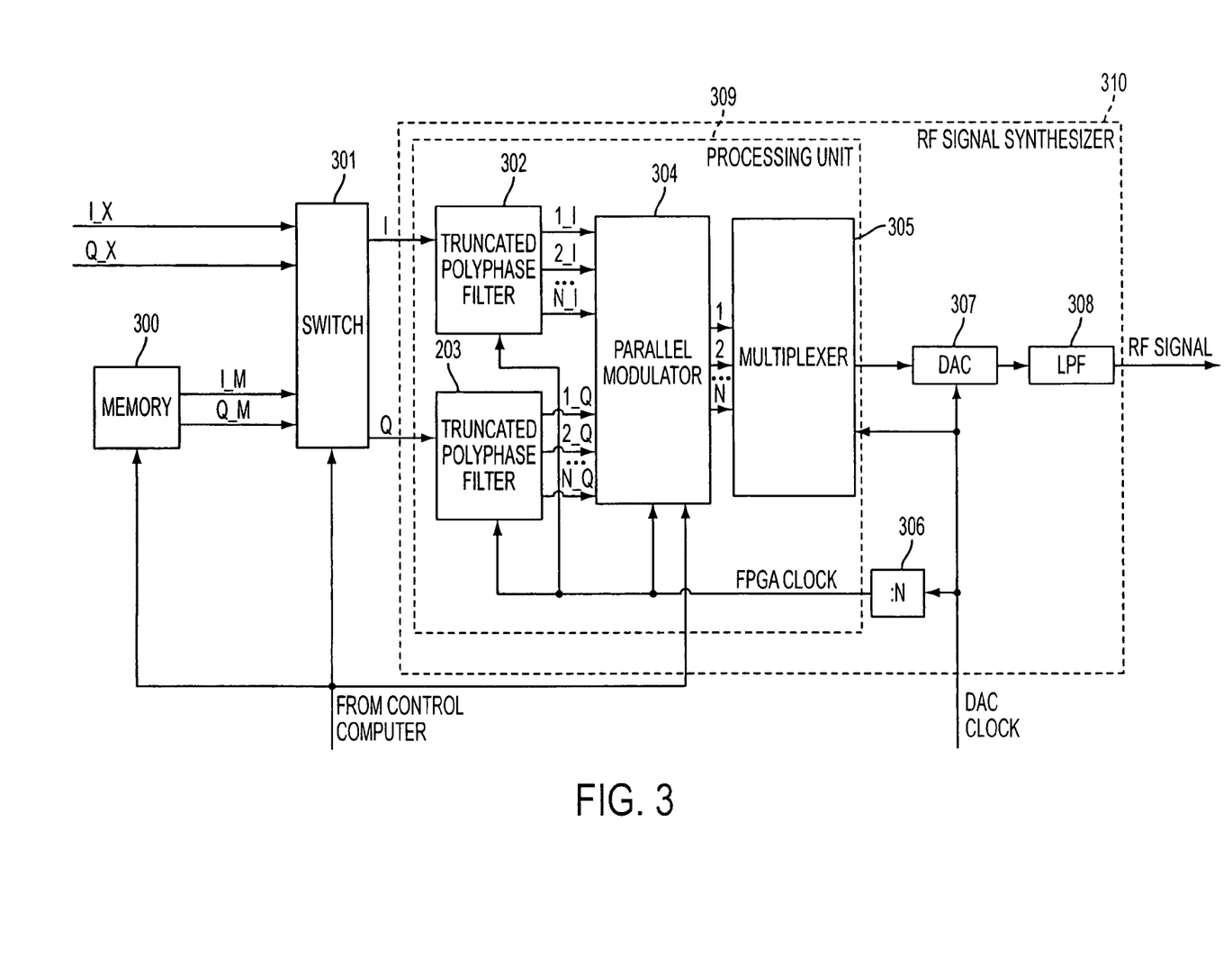
FIG. 3 is a block diagram of a vector signal generator with direct RF signal synthesis in accordance with the present invention.

An exemplary block diagram of the present teaching is shown in FIG. 3, according to an embodiment of the present teaching. In this diagram, the vector signal generator comprises a memory 300, a switch 301, and a RF signal synthesizer 310. Each of these devices has a control input that is connected to an outside control computer. The RF signal synthesizer 310 receives also an outside clock at its DAC clock input. The switch 301 under the control of the control computer selects the initial signals to be used for RF signal modulation. It may be either the external signals I_X and Q_X or the signals I_M and Q_M produced by the memory 300. The I and Q signals from the switch 301's outputs proceed to the inputs of the RF signal synthesizer 310 which transforms these signals into a modulated RF signal.

The RF signal synthesizer 310 contains a processing unit 309, a frequency divider by N 306 and a DAC 307 with a following LPF 308. The frequency divider by N 306 transforms the DAC clock into a FPGA clock. The processing unit 309 receives at its inputs the DAC clock, the FPGA clock, and the input signals I and Q to the RF signal synthesizer 310. The processing unit 309 produces, as its output, a digital version of the modulated RF signal. The control input to the processing unit 309 (from the control computer) is used to specify the modulated RF signal carrier frequency in accordance with an instruction from the control computer. The digital version of the modulated RF signal is then converted into an analog RF signal by the combination of the DAC 307 and LPF 308.

The processing unit 309 combines a plurality of device components that usually are located in the FPGA. The inputs to the two truncated polyphase filters 302 and 303 are I and Q inputs to the processing unit 309. The truncated polyphase filters 302 and 303 carry out interpolation of the input signals. The input signal I is a sequence of samples $sI(t_i)$ of an analog signal sI(t). Similarly, the input signal Q is a sequence of samples $sQ(t_i)$ of an analog signal sQ(t). The signals sI(t) and sQ(t) are unambiguously determined by the sequences $sI(t_i)$ and $sQ(t_i)$ with the property that the corresponding signal spectrums are bounded within half of the FPGA clock frequency. The distance in time T between adjacent instants $t_i$ is a reciprocal of the FPGA clock frequency. The interpolation begins with samples $sI(t_i)$ and results in samples $sI(t_i+j*T/N)$, $1<=j<=N-1$. The total sampling rate after the interpolation is $N*F_{FPGA}$. To make it possible to transport samples at such an aggregate rate, each truncated polyphase filter is limited to N outputs. The sampling rate at each of the outputs is $F_{FPGA}$ so that the aggregate rate is necessarily $N*F_{FPGA}$.

The outputs 1_I ... N_I of the truncated polyphase filters 302 and the outputs 1_Q ... N_Q of the truncated polyphase filters 303 are connected to the inputs of the parallel modulator 304. The clock input of the parallel modulator 304 is the FPGA clock and a control input is to the control input from the control computer. The control input to the parallel modulator 304 is to specify the modulated signal carrier frequency $F_c$. The parallel modulator 304 processes the signals at each pair of inputs j_I and j_Q, $1<=j<+=N$ independently. Sample $sI(t_i+j*T/N)$ that comes at the time instant of $t_i$ to the input j_I of the parallel modulator 204 is multiplied by cos(2*pi*F* $(t_i+j*T/N)$). Sample $sQ(t_i+j*T/N)$ that comes at the time instant of $t_i$ to the input j_Q of the parallel modulator 304 is multiplied by sin(2*pi*F*$(t_i+j*T/N)$). The sum of these two products is output by the parallel modulator 304 with a label j.

The outputs of the parallel modulator 304 are then connected to the inputs of the multiplexer 305. Here a conversion from parallel to serial samples flow produces an output signal with the sampling rate $N*F_{FPGA}$ that equals the DAC clock frequency $F_{DAC}$.

Figure 4:
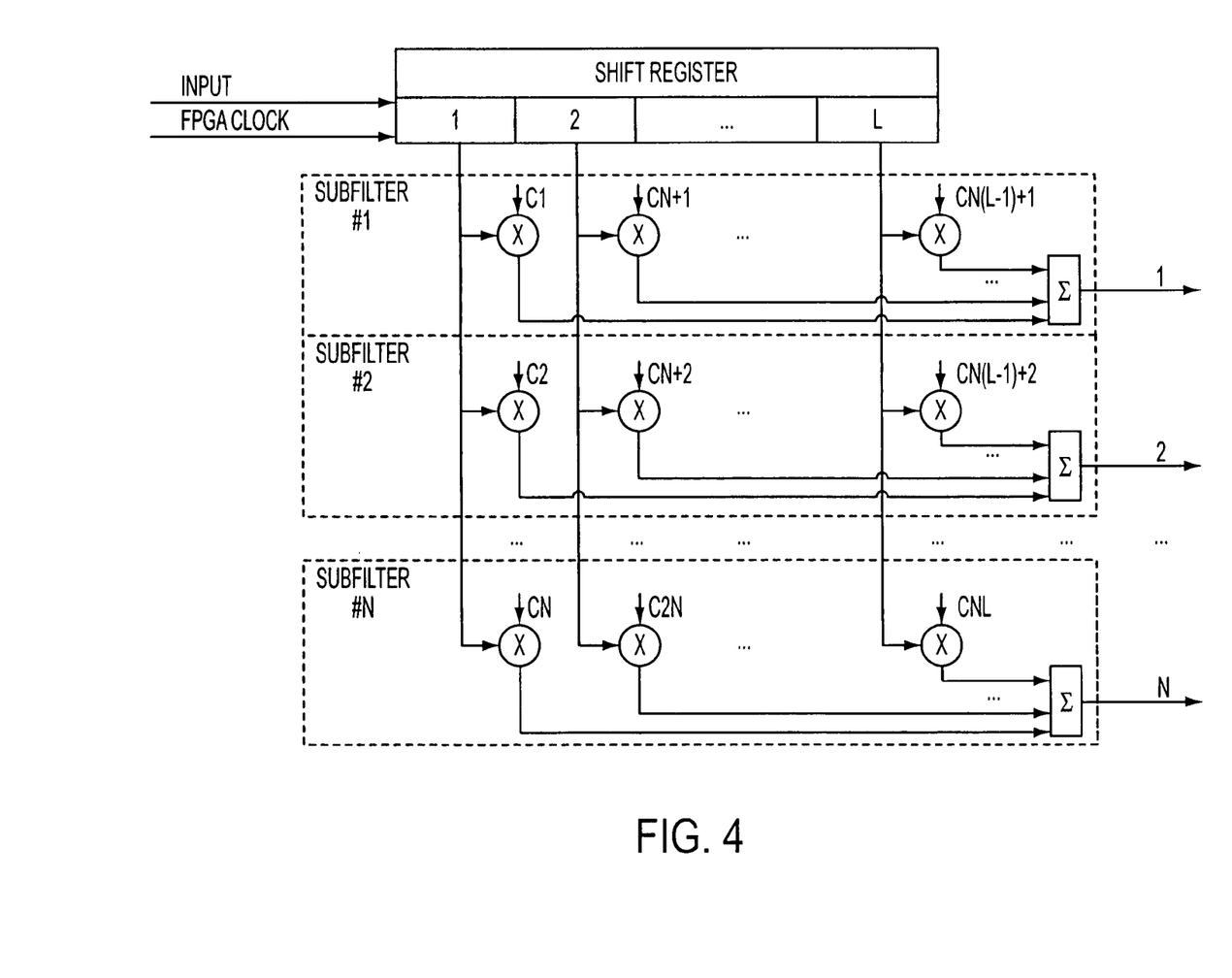
FIG. 4 is a block diagram of a truncated polyphase filter in accordance with the present invention.

The use of polyphase filters for signal interpolation is well known in the art. A polyphase filter usually comprises a set of N subfilters and a commutator (not shown) that connects the subfilters outputs one after another to the output of the polyphase filter. The sampling rate at the output of the commutator equals the sampling rate of the interpolated signal, in our case $N*F_{FPGA}$. A signal with such a sampling rate usually cannot be processed in an FPGA. Thus, polyphase filters can not be implemented directly in the processing unit of the RF signal synthesizer. Therefore the processing unit 309 is designed to use truncated polyphase filters so that the output commutator can be eliminated. A block diagram of a truncated polyphase filter is shown in FIG. 4.

An effective interpolation of a signal is carried out by first inserting N−1 zeros between samples $sI(t_i)$ (or samples $sQ(t_i)$) and the filtering the resulting sequence with an FIR (a filter with a finite-duration impulse response). An FIR with the a number of taps R is described by its coefficients $C_k$, $1<=k<=R$. The coefficients $C_k$ can be determined based upon the filter cutoff frequency, which should be less than $F_{FPGA}/2$, and the aggregate sampling rate of the interpolated signal is $N*F_{FPGA}$. To make it possible to use a truncated polyphase filter, the taps number R should be divisible by N: if the number of taps in a subfilter is L then R=N*L.

The truncated polyphase filter (FIG. 4) comprises a shift register and N subfilters. The shift register has a signal input and a clock input. The register stores L last samples of the input signal. A subfilter receives L samples from the shift register, each of the samples is multiplied by the correspondent coefficient $C_k$ and the products are summed to produce a sum serving as an output of the truncated polyphase filter. In the subfilter with label j, consecutive samples are multiplied by corresponding factors that equal to the aggregate FIR coefficients $C_j, C_{j+N}, C_{j+2*N}, \ldots, C_{j+N*(L-1)}$.

Figure 5:
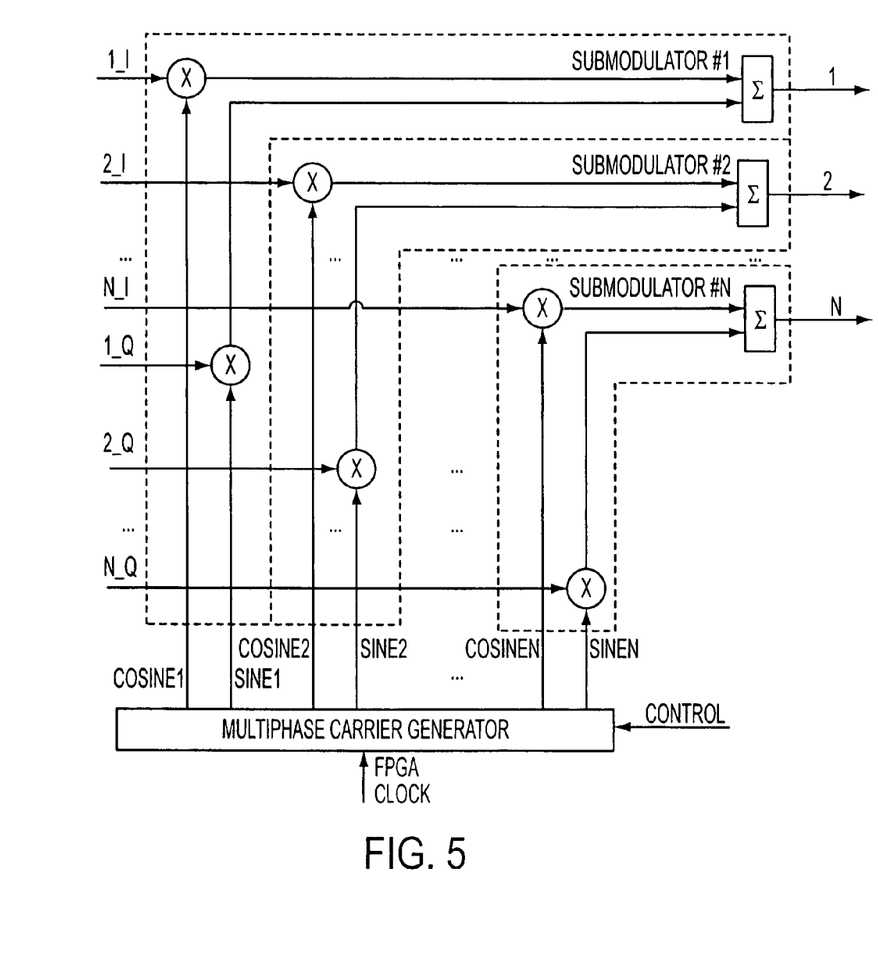
FIG. 5 is a block diagram of a parallel modulator in accordance with the present invention.

A block diagram of a parallel modulator is shown in FIG. 5. The parallel modulator comprises a multiphase carrier generator, a set of 2N multipliers and another set of N adders. The multiphase carrier generator has a clock input, that corresponds to an FPGA clock, a control input used to specify the modulated signal carrier frequency $F_c$, and N pairs of outputs. The multiphase carrier generator at the time instant of $t_i$ creates, at its outputs, 2N numbers that are values of sine/cosine waveforms phase-shifted one relative to another. The numbers at the pair of outputs with label j are cosine $(2*pi*Fc*(t_i+j*T/N))$ and sine $(2*pi*F_c*(t_i+j*T/N))$. The sample at input j_I of the parallel modulator is multiplied by the number cosine $(2piFc*(t_i+j*T/N))$, whereas the sample at input j_Q is multiplied by the number sine $(2piFc*(t_i+j*T/N))$. The products are then summed in a correspondent adder and serves as an output of the parallel modulator with label j.

Figure 6:
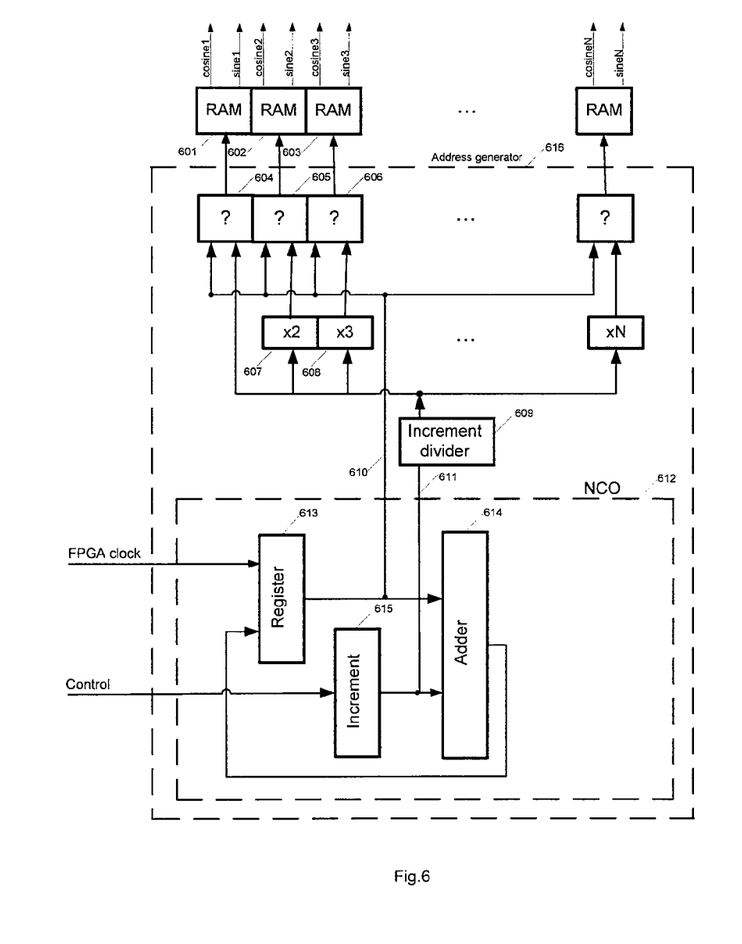
FIG. 6 is a block diagram of a multiphase carrier generator in accordance with the present invention.

A block diagram of the multiphase carrier generator is shown in FIG. 6. The multiphase carrier generator comprises a register 613, an increment unit 615, an adder 614, an increment divider 609, N−1 multipliers 607, 608, ..., N adders 604, 605, 606, ..., N RAMs 601, 602, 603, .... The register 613, the increment unit 615 and the adder 614 together with the connections among them form a numerically controlled oscillator (NCO) 612, which is well known in the art. The register 613 receives the FPGA clock through the multiphase carrier generator clock input. The control input of the multiphase carrier generator is used to load the increment to the increment unit 615 from the control computer and to set up the modulated signal carrier frequency $F_c$.

The NCO 612 has two outputs: a phase output 610 and an increment output 611. The increment output 611 is connected to the input of the increment divider 609. Since number N, as a rule, is adopted to be a power of 2, a division by N is done by the left shift of the number from the increment output 611 for the correspondent amount of bits. The output of the increment divider 609 is connected to the inputs of the multipliers 607, 608, . . . , which carry out multiplication by 2, 3, . . . , N, respectively. Each adder 604, 605, 606, . . . , has two inputs: one input is connected to the phase output 610 of the NCO 612, whereas the second input of the adder is connected to the output of correspondent multiplier 607, 608, . . . . An exception is the adder 604: its second input is connected to the increment output 611 of the NCO 612 directly (multiplication by 1). The NCO 612, the increment divider 609, the multipliers 607, 608, . . . , and the adders 604, 605, 606, . . . form an address generator 616.

The outputs of the adders 604, 605, 606, . . . , are the outputs of the address generator and are connected to the address inputs of RAMs 601, 602, 603, . . . . Each of the RAMs is a dual-port RAM loaded by the values of sine function for uniformly distributed argument values. The number at the first RAM output equals the sine of the number at it address input and the number at the second RAM output equals the cosine of the number at it address input.

The arrangement of multiphase NCO outlined above makes sure that the numbers at the pair of its output with the number j in the time instant $t_i$ equal cosine(2*pi*Fc*($t_i$+j*T/N)) and sine(2*pi*$F_c$*($t_i$+j*T/N)).

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A vector signal generator with direct RF signal synthesis, comprising:
    (a) an RF signal synthesizer configured for converting baseband IQ signals into a modulated digital RF signal, said RF signal synthesizer having an I input, a Q input, a clock input, a control input, and an output, wherein the clock input is a clock input of the vector signal generator, the control input is a control input of the vector signal generator, and the output is an RF signal output of the vector signal generator;
    (b) a switch configured for selecting a source of IQ signals, said switch being connected to an external I input, an external Q input, a stored signal I input, a stored signal Q input, the control input, an I output, and a Q output, wherein the external I input and external Q input are external IQ inputs to the vector signal generator and the I output and the Q output are connected to the I input and the Q input of the RF signal synthesizer; and
    (c) a memory configured for storing IQ signals samples, said memory being connected to the control input and having a stored I output, connected to the stored signal I input, and a stored Q output connected to the stored signal Q input.

2. The vector signal generator of claim 1, wherein the RF signal synthesizer comprises:
    (a) A processing unit configured for generating a high frequency modulated digital RF signal based on the I input, the Q input, the control input, the clock input, and an FPGA clock input;
    (b) A digital to analog converter (DAC) configured for converting the digital RF signal to generate an analog RF signal;
    (c) A frequency divider by N configured for converting the clock input to generate the FPGA clock; and
    (d) A low pass filter configured for suppressing spurious high frequency components of the analog RF signal to produce a filtered RF signal as an output of the RF signal synthesizer.

3. The vector signal generator of claim 2, wherein the processing unit comprises:
    (a) a first truncated polyphase filter configured for generating interpolated I signals based on the I input of the RF signal synthesizer and the FPGA clock;
    (b) a second truncated polyphase filter configured for generating interpolated Q signals based on the Q input of the RF signal synthesizer and the FPGA clock;
    (c) a parallel modulator configured for frequency up conversion of the interpolated I and Q signals to generate a plurality of outputs, said modulator connecting to the clock input, the control; and
    (d) a multiplexer configured for assembling the plurality of outputs from the parallel modulator into a the high frequency modulated digital RF signal based on the clock input.

4. The vector signal generator of claim 3, wherein each of the truncated polyphase filters comprises:
    (a) a shift register for storing a first plurality of last symbols of the truncated polyphase filter input signal, said shift register having an input and L outputs; and
    (b) N subfilters, each of the said subfilters having L inputs and an output, wherein the L inputs are connected to the correspondent outputs of the shift register and the output serves as the correspondent truncated polyphase filter output.

5. The vector signal generator of claim 4, wherein each of the subfilters is a linear time-invariant unit with a finite-duration impulse response (FIR) having length of L taps.

6. The vector signal generator of claim 5, wherein coefficients of the FIR subfilters are calculated by:
    (a) calculating coefficients $C_k$, $1<=k<=L*N$, of an aggregate interpolation filter based on an aggregate filter cut-off frequency and an aggregate sampling rate of the interpolated signal; and
    (b) equating the coefficients of the subfilter with the number j to $C_j, C_{j+N}, C_{j+2*N}, \ldots, C_{j+L*N}$.

7. The vector signal generator of claim 4, wherein the number of subfilters N of each truncated polyphase filter equals a ratio of the DAC clock of the RF signal synthesizer to the FPGA clock of the processing unit.

8. The vector signal generator of claim 3, wherein the parallel modulator comprises:
    (a) a multiphase carrier generator configured for generating N pairs of sine/cosine carriers, said multiphase carrier generator having a clock input, a control input and 2N outputs; and (b) N submodulators each of which being configured for modulating a corresponding part of the aggregate processed signal, each of the submodulators connecting to an I input, a Q input, corresponding sine and cosine carriers as inputs, and an output, wherein the connected I input and the Q input are modulator signal inputs, the corresponding sine and cosine carriers inputs are connected to the corresponding outputs of the multiphase carrier generator and the output is the corresponding output of the modulator.

9. The vector signal generator of claim 8, wherein the number of submodulators in the parallel modulator equals the ratio of the DAC clock of the RF signal synthesizer to the FPGA clock of the processing unit.

10. The vector signal generator of claim 5, wherein the multiphase carrier generator comprises:
(a) a set of N RAMs, each of the RAMs having an address input, a sine output and a cosine output, the sine and cosine outputs being the outputs of the multiphase numerically controlled oscillator; and
(b) an address generator, having a clock input, a control input and N address outputs, wherein the clock input is the clock input of the multiphase carrier generator, the control input is the control input of the multiphase carrier generator and the address outputs are the address inputs of the corresponding RAMs.

11. The vector signal generator of claim 10, wherein the address generator comprises:
(a) a numerically controlled oscillator having a clock input, a control input, a phase output, and an increment output, wherein d the control input is used to control the address generator;
(b) an increment divider having an input and an output, wherein the input is connected to the increment output of the numerically controlled oscillator;
(c) a set of N−1 multipliers, each of the multipliers having an input and an output, wherein all inputs of the multipliers are merged and connected to the output of the increment divider; and
(d) a set of N adders, each of the adders having a first input, a second input and an output, wherein the first inputs of all adders are merged and connected to the phase output of the numerically controlled oscillator, the second inputs of all adders except the first one are connected to the outputs of the corresponding multipliers, the second input of the first adder is connected to the output of the increment divider and the outputs of the said adders serve as the outputs of the address generator.

12. The vector signal generator of claim 11, wherein each of the multipliers multiplies its input of the multiplier by a corresponding factor from a set with values 2, 3, 4, ..., N.

13. The vector signal generator of claim 11, wherein the increment divider divides its input by N.

14. The vector signal generator of claim 8, wherein a frequency $F_{carrier}$ of a carrier of the modulated RF signal is set up from a control computer by loading a corresponding increment value through the control input of the multiphase carrier generator.

* * * * *